United States Patent

Cataldo

[11] 3,805,752
[45] Apr. 23, 1974

[54] QUENCHED COMBUSTION SEPARATED CHARGE INTERNAL COMBUSTION ENGINE

[75] Inventor: Roy S. Cataldo, Birmingham, Mich.

[73] Assignee: General Motors Corporation, Detroit, Mich.

[22] Filed: Feb. 23, 1973

[21] Appl. No.: 334,999

[52] U.S. Cl............. 123/75 R, 123/26, 123/59 EC, 123/119 A
[51] Int. Cl. ... F02b 75/02, F02b 41/00, F02b 33/00
[58] Field of Search............ 123/75 R, 70 R, 26, 28, 123/59 EC; 60/15

[56] References Cited
UNITED STATES PATENTS
1,904,775  4/1933  Bartholomew................. 123/26
1,889,650  11/1932  Fredrickson................... 123/75 R
1,076,854  10/1913  Wright........................... 123/70 R Primary Examiner—Carlton R. Croyle
Assistant Examiner—Louis J. Casaregola
Attorney, Agent, or Firm—Robert J. Outland

[57] ABSTRACT

A four-stroke cycle spark ignition internal combustion engine is provided in a preferred embodiment with one or more pairs of closed end cylinders having pistons arranged to reciprocate in phase or less than about one-half stroke out of phase and defining expansible chambers connected by a short transfer port. One of the chambers includes a spark plug near the transfer port, as well as valve-controlled intake and exhaust ports for respectively admitting combustible mixture to the chamber and exhausting spent gases therefrom. The other chamber includes a valve-controlled intake port for admitting air and/or exhaust gases to the chamber and a transfer valve to control the exhaust and intake of gases through the transfer port. The operating cycle involves reducing cylinder temperatures by quenching the earliest burned portions of the mixture ignited in one chamber through mixing it with portions of the air or air-exhaust mixture compressed in the other chamber shortly after the beginning of combustion in the one chamber. The mixing is accomplished by transferring gases between the cylinders through the transfer port.

3 Claims, 7 Drawing Figures

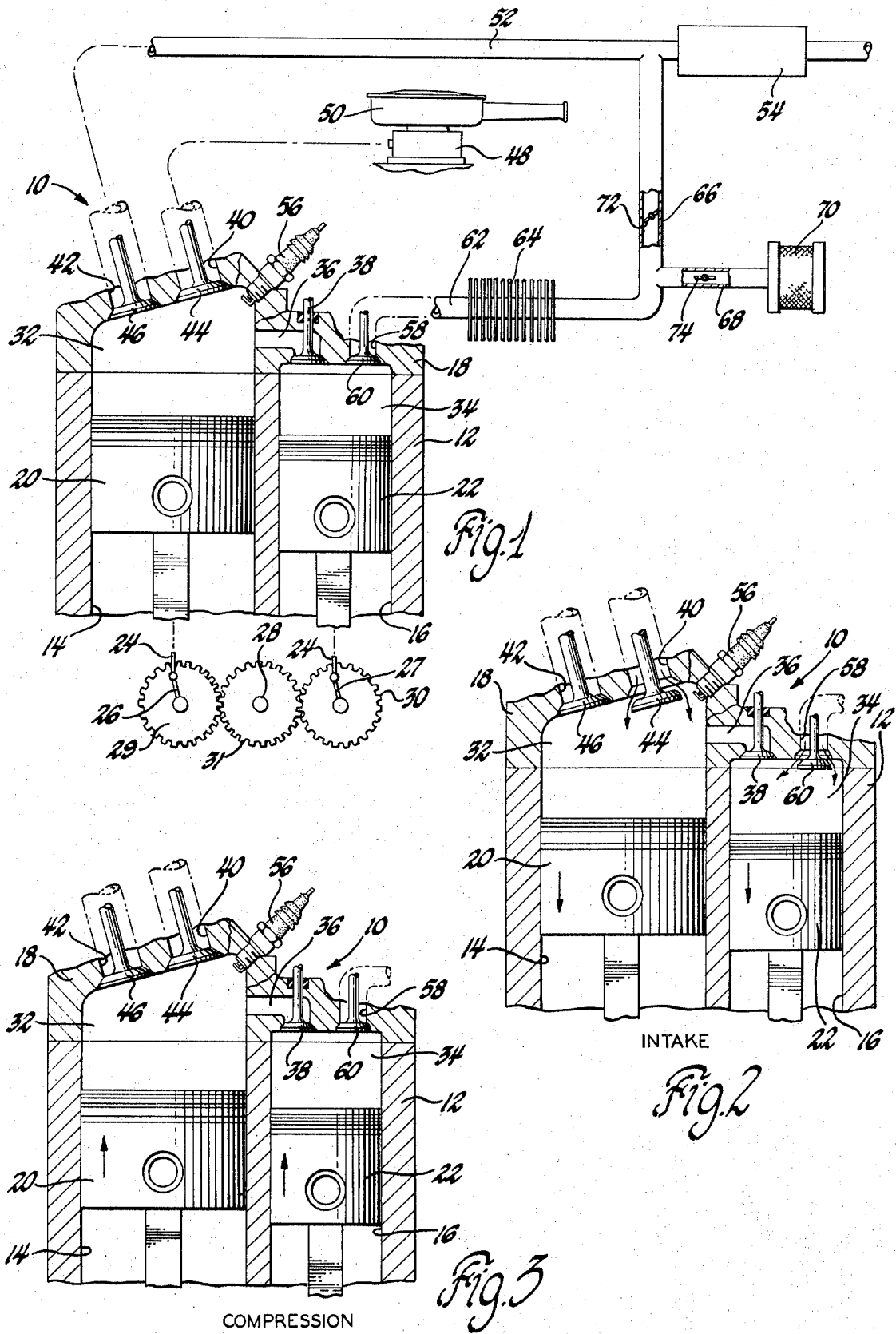

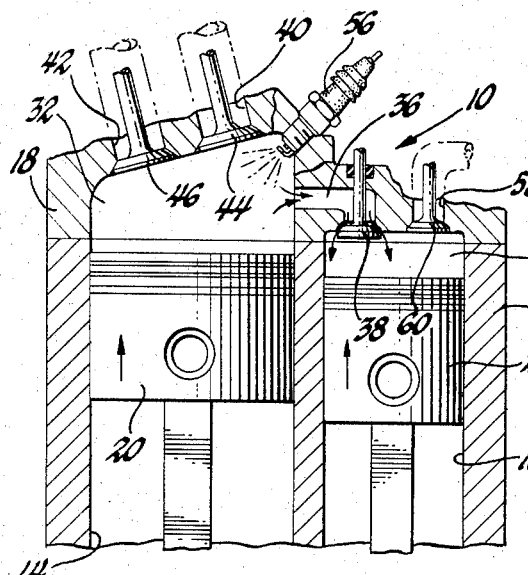
Fig. 4
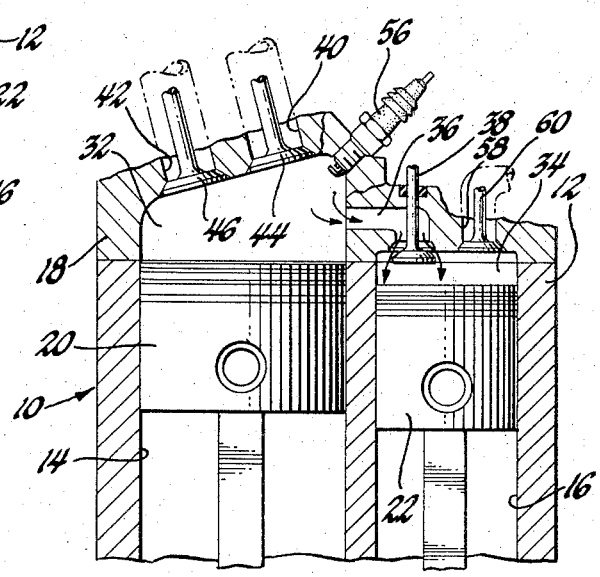
COMBUSTION & QUENCH
Fig. 5
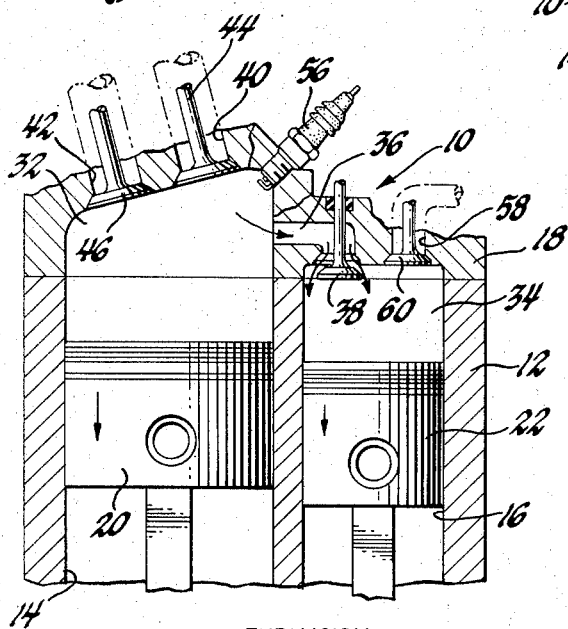
Fig. 6 EXPANSION
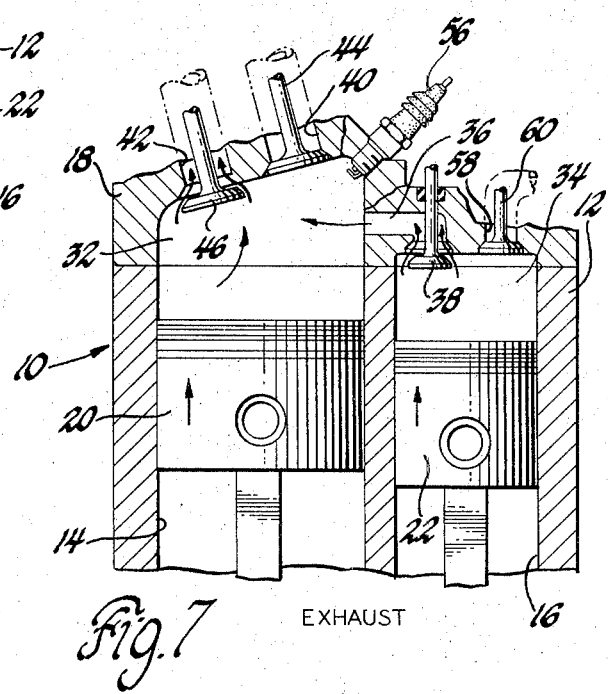
Fig. 7 EXHAUST

3,805,752

QUENCHED COMBUSTION SEPARATED CHARGE INTERNAL COMBUSTION

FIELD OF THE INVENTION

This invention relates to internal combustion engines of the spark ignition type and, more particularly, to engine arrangements utilizing pairs of interconnected cylinders operating on the four-stroke cycle in the same or similar phase relationships and to a method of operation of such engines involving quenched combustion through mixture of separated dissimilar compressed charges during combustion of one of the charges.

BACKGROUND OF THE INVENTION

It is indicated in the prior art that spark-ignited internal combustion engines utilizing stratified charges in the same or adjacent chambers of the same cylinder may be operated with more complete combustion over a wider load range than is true of more conventional homogeneous charge engines. It has been further suggested that stratified charge engines may be operated to produce lower exhaust emissions of hydrocarbons, carbon monoxide and oxides of nitrogen than can homogeneous charge engines.

In actual practice, however, it has proved difficult to control the stratification of the charge within the same or connecting chambers of the same cylinder under various engine operating conditions so that the theoretically available improvements in combustion and reductions in exhaust emissions have been difficult to achieve.

High pressure fuel injection into the cylinder, as is used in diesel engines and some stratified charge gasoline engines, results in inadequate control of the localized air-fuel ratios, resulting in the excessive formation of oxides of nitrogen in the combustion process. On the other hand, the use of auxiliary chambers or precombustion chambers has shown improvement over open chamber engines but lacks the degree of control desired over the manner and timing of mixing of the rich and lean mixture portions or exhaust recycle gases which may be introduced.

SUMMARY OF THE INVENTION

The present invention goes beyond the monocylinder charge stratification concept by providing for physical separation in separate cylinders of two charges which are mixed during combustion to quench the burning combustible mixture and thereby control flame temperatures and the resultant formation of oxides of nitrogen. Control of hydrocarbons and carbon monoxide is also obtained by the overall lean mixture of the combined charges.

The novel arrangement involves providing an engine with separate pairs of cylinders having combustion chambers which are connected by a short transfer port. One of the chambers has means for admitting a charge of combustible mixture, spark ignition means such as a spark plug located adjacent the transfer port to ignite the combustible mixture at that point and means permitting the exhaust of the burned gases. The other chamber includes means for admitting a charge of air or a combination of air and exhaust gases. Valve means are also provided in the transfer port to control the interchange of gases between the two chambers.

The method involves igniting a compressed charge of combustible mixture in the one chamber adjacent the transfer port and subsequently transferring gases between chambers to quench the earliest burned portions of the combustible mixture with air or a mixture of air and exhaust gases so as to control combustion temperatures.

These and other features and advantages of the invention will be more fully understood from the following discussion and description of a preferred embodiment of the invention, taken together with the accompanying drawings.

BRIEF DESCRIPTION OF THE DRAWINGS

In the drawings:

FIG. 1 is a diagrammatic view illustrating the arrangement of the engine formed according to the invention; and FIGS. 2 – 7 are diagrammatic views showing sequential steps in the operation of the engine of FIG. 1.

DESCRIPTION OF A PREFERRED EMBODIMENT

Referring first to FIG. 1 of the drawings, there is shown an internal combustion engine generally indicated by numeral 10. Engine 10 includes a cylinder block 12 having formed therein at least one, and preferably several, pairs of adjacent cylinders 14 and 16, respectively. The upper ends of the cylinders 14, 16, as shown in the drawing, are closed by a cylinder head 18, while the lower ends are closed by pistons 20, 22, which are reciprocably movable in cylinders 14, 16, respectively.

Cylinder 14, as shown, is substantially larger than cylinder 16. However, it is considered within the scope of the invention that the cylinders be of either the same or different sizes. Pistons 21 and 22 are interconnected with one another through any suitable mechanism which provides concurrent reciprocating movement. In the disclosed embodiment, the pistons are arranged for movement in phase through a four-stroke cycle with identical lengths of strokes. However, it is possible to vary the stroke lengths as desired and reciprocation need not be exactly in phase but may be selected to be out of phase as much as one-half stroke without departing from the concepts of the invention. The pistons are secured to connecting rods 24, which are in turn connected with a timing and power output mechanism that may include a pair of cranks 26, 27 driving a central output shaft 28 through gears 29, 30 and 31.

Cylinder head 18, which closes the end of the cylinders, also cooperates with the cylinders and their respective pistons to define first and second expansible chambers 32 and 34, respectively. Chamber 32 acts as a main combustion chamber, while chamber 34 may be denominated a quench chamber. A transfer port 36 is provided in the cylinder head, interconnecting the chambers 32, 34. A poppet valve 38 opening into chamber 34 is provided to control the passage of gases between the chambers through the transfer port 36.

Chamber 32, as shown, forms, when the piston is in its top center position, a typical wedge-shaped engine combustion chamber. Inlet and exhaust ports 40, 42, controlled by inlet and exhaust valves 44, 46, respectively, extend through the cylinder head wall to chamber 32. Inlet port 40 is connected with a source of combustible air-fuel mixture, such as carburetor 48, which receives air through air filter 50. Exhaust port 42 connects with an exhaust system, including an exhaust pipe 52 and muffler 54. Chamber 32 is also provided with spark ignition means in the form of a spark plug 56 mounted near the high point of the wedge-shaped chamber, closely adjacent the transfer port 36.

Chamber 34 may be of rectilinear cross section, as shown, or may, for design reasons, have any other suitable configuration. This chamber is also provided with an inlet port 58 controlled by a poppet valve 60. Inlet port 58 connects chamber 34 with an induction and exhaust recirculation system which includes an intake pipe 62, heat exchanger 64 and a pair of inlet legs 66, 68 connecting, respectively, with the exhaust pipe 52 and an inlet air filter 70. Control valves 72, 74 are provided in the legs 66, 68 to regulate the percentage of air and exhaust gases delivered to the inlet port 58.

The inlet valves 44, 60, exhaust valve 46, and transfer valve 38 are connected through suitable actuating means, not shown, with the engine timing and output mechanism for operation in time with the movement of the engine pistons on a cycle to be subsequently described.

In the disclosed arrangement, the pistons 20, 22 are timed by the output mechanism to move in phase through equal stroke lengths in a manner so as to provide equivalent compression ratios for the chambers 32, 34 of the two cylinders. The valve operating mechanisms are timed in conjunction with the piston movements to provide four-stroke cycle operation generally in accordance with a conventional operational cycle, including intake, compression, expansion and exhaust strokes. The action of the transfer valve 38 will be made clear from the following description of engine operation according to the prescribed method.

In operation, on the intake stroke, as shown in FIG. 2, intake valves 44 and 60 are open while both pistons move downwardly to their bottom center positions. The transfer and exhaust valves 38, 46 remain closed. Thus, this action draws a combustible air-fuel mixture into chamber 32 and a charge of air or air and exhaust gases into chamber 34, depending on the positioning of the control valves 72, 74.

On the compression stroke, as shown in FIG. 3, all valves are closed as the pistons move upwardly, compressing the gaseous fluids in their respective chambers. Toward the end of the compression stroke, as shown in FIG. 4, the spark plug is fired, igniting the mixture in chamber 32, while at about the same time the transfer valve 38 begins to open.

Shortly thereafter, while the pistons are still near their top dead center positions, as shown in FIG. 5, combustion of the mixture in chamber 34 is progressing rapidly and the transfer valve 38 nears its full open position, permitting some of the burned and burning products adjacent to the spark plug to escape through the transfer port 36 into chamber 34. This action mixes the earliest burned portions of the mixture from chamber 32, which are adjacent the transfer passage with the air or air-exhaust gas mixture in chamber 34, quenching the burned gases and limiting the temperatures reached therein. At the same time, the removal of the earliest burned gases from chamber 32 is effective in limiting the temperatures reached there, as well as controlling pressure rise to some extent.

As the pistons move downward on their expansion strokes, shown in FIG. 6, the transfer valve 38 remains open, permitting expansion of the burned gases in both chambers 32 and 34 and yielding power output from both pistons.

When the pistons reach bottom dead center, the exhaust valve 46 is opened and, the transfer valve 38 remaining open, the pistons move upwardly on their exhaust strokes, as shown in FIG. 7. This action causes the gases in chamber 34 to be forced through the transfer passage 36 into chamber 32, mixing with the gases therein. Simultaneously, the gases in chamber 34 are being forced by the upward movement of piston 20 through the exhaust port 42 and out through the exhaust system in preparation for the next intake stroke.

In variations of the above-described method and structure, it is considered within the scope of the invention to alter the timing or compression ratios, as well as the sizes, of the pairs of cylinders in a fashion to vary the mixture flow to provide the most suitable quenching effect. In particular, it may be desirable, for example, to reduce the compression ratio of quench chamber 34 so that a greater portion of the gases in main chamber 32 will be forced into chamber 34 when the transfer valve is open, thereby increasing the quenching action. Alternatively, the compression ratio of the quench chamber 34 may be substantially increased so that air from this chamber is forced through the transfer passage into the combustion chamber 32 when the transfer valve is opened, causing the quenching action to take place in the combustion chamber 32, rather than in the quench chamber 34.

The quenching action, which is primarily intended to reduce the formation of oxides of nitrogen during the engine cycle, may be accomplished by supplying either air or exhaust gases or a mixture thereof in the quench chamber 34. When exhaust gases are used, it is desirable that they be cooled and this is accomplished by their passage through the heat exchanger 64 as they are drawn into the chamber 34. On the other hand, control of hydrocarbon and carbon monoxide emissions makes it desirable that chamber 34 contain a significant proportion of excess oxygen. For this reason, it is felt that the quenching fluid with which chamber 34 is charged should contain a substantial proportion of air and it may be preferable that pure air with no exhaust gases be used for this purpose.

It is additionally possible to combine the above method with other means for reducing emissions in order to provide the most desirable engine operating characteristics. For example, it may be advantageous to provide air-fuel mixtures in chamber 32 that are richer (in fuel) than stoichiometric so that oxides of nitrogen will be minimized to an extent greater than that which may be provided by the quenching action alone. Operation of an engine in accordance with this method has indicated that emissions of carbon monoxide and hydrocarbons are reduced by the subsequent mixing action to provide an overall lean mixture, even though an initial rich mixture is used in the engine combustion chamber.

The foregoing references to certain preferred embodiments of the invention have been for purposes of description rather than limitation, and it is accordingly desired that the invention be accorded the full scope permitted by the following claims.

I claim:

1. The method of operating an internal combustion engine having a pair of cylinders and pistons defining adjacent first and second expansible chambers and means interconnecting said chambers, said method comprising supplying a combustible mixture of air and hydrocarbon fuel to said first chamber while simultaneously supplying a charge of quenching and oxidizing gas to said second chamber, compressing separately the mixture in said first chamber and the gas in said second chamber, igniting and burning the mixture in said first chamber, quenching the earliest burned parts of the mixture in said first chamber by transferring during the early combustion stages a portion of the fluid in one of said chambers to the other of said chambers to mix with a portion of the fluid therein, said fluid transfer beginning when said piston in said first chamber is still near it's top dead center position, one of said fluid portions including the earliest burned parts of the mixture in said first chamber, expanding the fluid in both said chambers with an output of power, and transferring the expanded gases from said second chamber into said first chamber for mixing with the gases therein and simultaneously exhausting the mixed gases from said first chamber.

2. The method of operating an internal combustion engine having a pair of cylinders and pistons defining adjacent first and second expansible chambers and means interconnecting said chambers, said method comprising the steps of:

simultaneously expanding said chambers while supplying to said first chamber a combustible mixture of air and hydrocarbon fuel and supplying air to said second chamber, separately compressing the mixture in said first chamber and the air in said second chamber, igniting and burning the mixture in said first chamber, quenching the earliest burned parts of said mixture during the early stages of combustion by transferring to said second chamber a portion of the partially burned mixture in said first chamber, including the earliest burned parts of said mixture, to mix with the air in said second chamber, said fluid transfer beginning when said piston in said first chamber is still near it's top dead center position, expanding the fluid in both said chambers with an output of power, and simultaneously mixing together and exhausting the expanded products in said chambers.

3. An internal combustion engine adapted for quenched combustion separated charge operation, said engine comprising means defining first and second cylinders, each closed at one end and having their closed ends proximate one another, pistons reciprocable in said cylinders and defining therewith first and second expansible chambers at the closed ends of said first and second cylinders, respectively, said pistons being connected to a common power output mechanism for concurrent reciprocation of a four-stroke operating cycle with a phase separation not greater than one-half stroke, a valve-controlled inlet port to said first chamber, said port being connected with air-fuel mixture supply means, a valve-controlled inlet port to said second chamber, said port being connected with a source of air, a valve-controlled transfer port interconnecting adjacent portions of said first and second chambers, a valve controlled exhaust port from said first chamber, said port connecting with the engine exterior, spark ignition means in said first chamber and closely adjacent said transfer port, and valves in said ports and controlling means for opening said transfer valve when said piston in said first chamber is near top dead center position on it's power stroke.

* * * * *